US010946745B2

(12) United States Patent
Devshatwar et al.

(10) Patent No.: US 10,946,745 B2
(45) Date of Patent: Mar. 16, 2021

(54) GPU-LESS INSTRUMENT CLUSTER SYSTEM WITH FULL ASSET SWEEP

(71) Applicant: TEXAS INSTRUMENTS INCORPORATED, Dallas, TX (US)

(72) Inventors: Nikhil Nandkishor Devshatwar, Bangalore (IN); Santhana Bharathi N., Tamil Nadu (IN); Subhajit Paul, Bangalore (IN); Shravan Karthik, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 163 days.

(21) Appl. No.: 16/107,664

(22) Filed: Aug. 21, 2018

(65) Prior Publication Data

US 2019/0061530 A1 Feb. 28, 2019

(30) Foreign Application Priority Data

Aug. 30, 2017 (IN) .............................. 201741030716

(51) Int. Cl.
*B60K 37/02* (2006.01)
*G06T 15/00* (2011.01)
(Continued)

(52) U.S. Cl.
CPC .............. *B60K 37/02* (2013.01); *B60K 35/00* (2013.01); *G06T 13/00* (2013.01); *G06T 15/005* (2013.01); *G06T 15/503* (2013.01); *G06T 19/20* (2013.01); *B60K 2370/152* (2019.05); *B60K 2370/155* (2019.05); *B60K 2370/1531* (2019.05); *G06T 15/506* (2013.01); *G06T 15/60* (2013.01); *G06T 15/80* (2013.01); *G06T 2210/12* (2013.01); *G06T 2219/2016* (2013.01)

(58) Field of Classification Search
None
See application file for complete search history.

(56) References Cited

U.S. PATENT DOCUMENTS 5,822,335 A * 10/1998 Dannenberg ........... G01D 18/00
714/733
2008/0195242 A1* 8/2008 Tidwell ................ G01D 11/28
700/103

(Continued)

*Primary Examiner* — Edward Martello
(74) *Attorney, Agent, or Firm* — Brian D. Graham; Charles A. Brill; Frank D. Cimino

(57) ABSTRACT

A method for implementing a full sweep in a digital instrument cluster system without a graphical processing unit (GPU) is disclosed. The method includes displaying a static asset as background for displaying of dynamic assets that point to different position values on the static asset, sequentially retrieving each of a plurality of subsets of dynamic assets such that each subset provides position indicators with a different level of position granularity, wherein an order of retrieving each subset moves from a lowest granularity subset to a highest granularity subset until all of the plurality of subsets of dynamic assets have been retrieved, and performing a full sweep, prior to retrieving of the dynamic assets, by sequentially displaying the dynamic assets from a minimum position to a maximum position of the static asset, and back, the sequentially displaying being based on a highest available granularity of dynamic assets that have been retrieved.

20 Claims, 8 Drawing Sheets

(51) Int. Cl.
*G06T 13/00* (2011.01)
*B60K 35/00* (2006.01)
*G06T 15/50* (2011.01)
*G06T 19/20* (2011.01)
*G06T 15/60* (2006.01)
*G06T 15/80* (2011.01)

(56) References Cited

U.S. PATENT DOCUMENTS

2008/0204460 A1* 8/2008 Marinkovic ........... G09G 5/363
 345/502
2013/0144482 A1* 6/2013 Tuukkanen ............... B60R 1/00
 701/29.6
2019/0266698 A1* 8/2019 Doll ........................ G06T 13/80

* cited by examiner

GPU-LESS INSTRUMENT CLUSTER SYSTEM WITH FULL ASSET SWEEP

RELATED APPLICATIONS

This application claims priority from Indian Application No. 201741030716, filed 30 Aug. 2017, which is incorporated herein in its entirety.

TECHNICAL FIELD

This relates to digital instrument graphics, and more particularly to a GPU-less instrument cluster system with full asset sweep.

BACKGROUND

A digital cluster system provides a software application that mimics an analog cluster system. Digital instrument clusters are typically implemented using a GPU to allow for rich graphical content and effects like shadow, depth, and lighting. For an advanced driver assistance system (ADAS), the digital instrument cluster displays vehicular parameters like speed, engine revolutions per minute (RPM), engine status, etc. on a digital display. The time to boot a digital instrument cluster is a metric used to evaluate the cluster's performance.

SUMMARY

This disclosure relates to a method and apparatus for implementing a GPU-less cluster system with a full asset sweep.

In one example, a method for implementing a full sweep in a digital cluster system without a graphical processing unit (GPU) is disclosed. The method includes displaying a static asset as background for displaying of dynamic assets that point to different position values on the static asset, sequentially retrieving each of a plurality of subsets of dynamic assets such that each subset provides position indicators with a different level of position granularity, wherein an order of retrieving each subset moves from a lowest granularity subset to a highest granularity subset until all of the plurality of subsets of dynamic assets have been retrieved, and performing a full sweep, prior to retrieving of all of the dynamic assets, by sequentially displaying the dynamic assets from a minimum position to a maximum position of the static asset, and back, the sequentially displaying being based on a highest available granularity of dynamic assets that have been retrieved.

In another example, an apparatus for implementing a full sweep in a digital cluster system without a graphical processing unit (GPU) is disclosed. The apparatus includes a memory configured to store compressed preprocessed assets, the assets having been compressed and preprocessed offline to provide simulated GPU graphical effects. The apparatus further includes a processor configured to execute a variety of computer executable components, the computer executable components comprising a display component configured to display a static asset as background for displaying of dynamic assets that represent position indicators that point to different position values on the static asset, a retrieval component configured to sequentially retrieve each of a plurality of subsets of dynamic assets such that each subset provides the position indicators with a different level of position granularity, wherein an order of retrieving each subset moves from a lowest granularity subset to a highest granularity subset until all of the plurality of subsets of dynamic assets have been retrieved, and a sweep component configured to perform a full sweep, prior to retrieving of all of the dynamic assets, by sequentially displaying the dynamic assets from a minimum position value to a maximum position value of the static asset, and back from the maximum position value to the minimum position value of the static asset, the sequentially displaying being based on a highest available granularity of dynamic assets that have been retrieved during the sequentially retrieving.

In another example, a method for booting a GPU-less digital cluster subsystem is disclosed. The method includes, by a first thread executing on a first processor, booting an image processing unit configured to perform image analysis, filtering, format conversion, and compression and decoding, retrieving compressed cluster assets from a memory, and booting a high-level operating system, wherein the high-level operating system executes a GPU-based digital cluster subsystem, such that the GPU-less digital cluster subsystem serves as a backup mechanism if the GPU-based digital cluster subsystem fails or becomes unavailable. The method further includes, by a second thread executing on a second processor, initializing a display, decoding and displaying a static asset as background for displaying of dynamic assets that represent position indicators that point to different position values on the static asset, sequentially retrieving each of a plurality of subsets of dynamic assets such that each subset provides the position indicators with a different level of position granularity, wherein an order of retrieving each subset moves from a lowest granularity subset to a highest granularity subset until all of the plurality of subsets of dynamic assets have been retrieved, performing a full sweep, prior to retrieving of all of the dynamic assets, by sequentially displaying the dynamic assets from a minimum position value to a maximum position value of the static asset, and back from the maximum position value to the minimum position value of the static asset, the sequentially displaying being based on a highest available granularity of dynamic assets that have been retrieved during the sequentially retrieving, and displaying a dynamic asset on the static asset at an approximate position that approximates a correct position after the full sweep is completed, and prior to when each of the plurality of subsets of dynamic assets has been retrieved. The first thread and the second thread execute concurrently.

DETAILED DESCRIPTION

Figure 1:
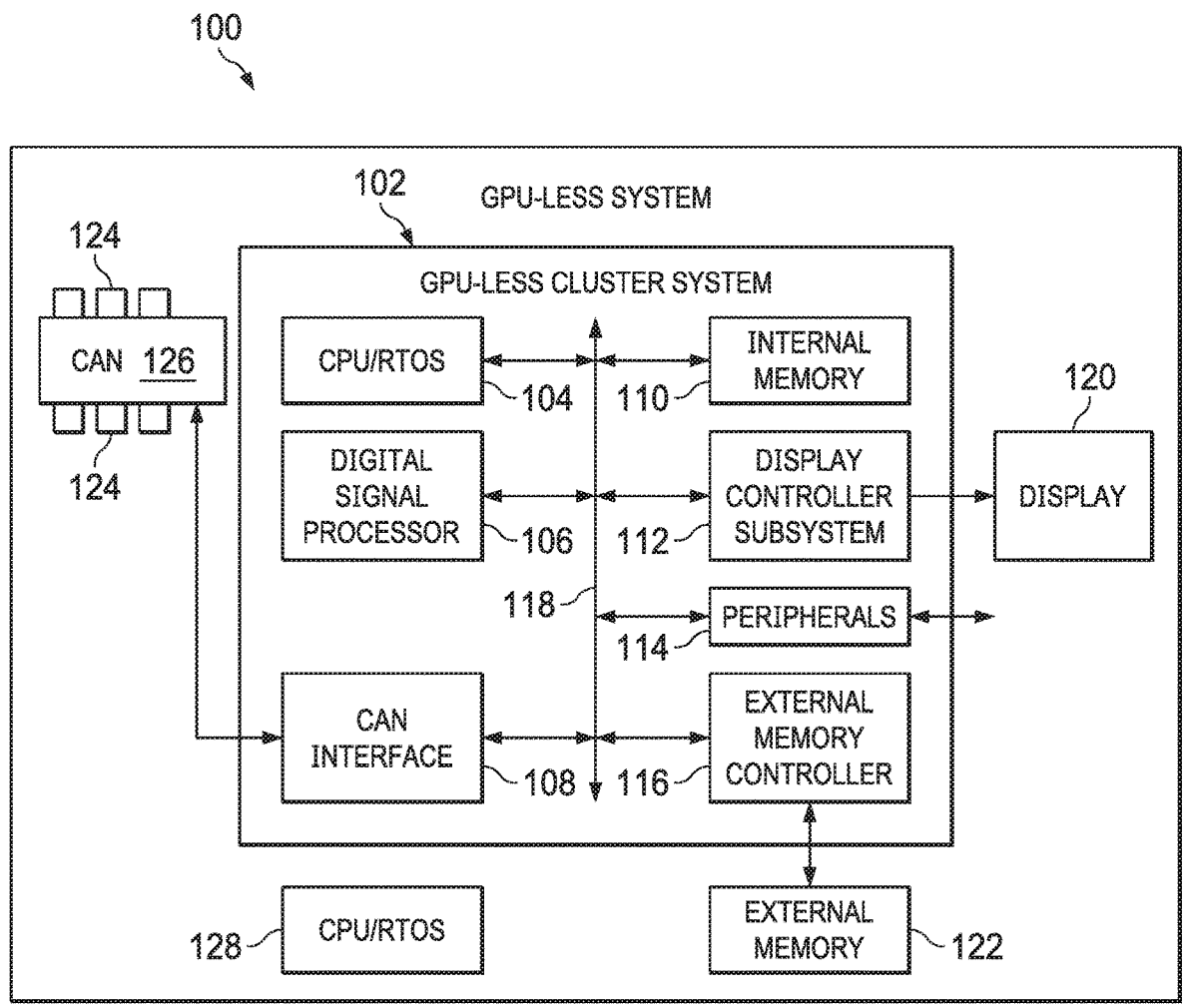
FIG. 1 depicts a GPU-less system showing the hardware components of a GPU-less cluster system.

A cluster is a system or subsystem comprising a number of different hardware and software components that implement an application and cooperate to gather data and then render that data onto a display. For example, a digital instrument cluster can be used to render data to a digital instrument panel for a vehicle, where the digital instrument panel includes information important to the driver such as speed, fuel level, and navigation information. Clusters that have a GPU are more powerful (e.g., more processing capability) than clusters that do not have a GPU. This is because the GPU itself is capable of performing interesting and sophisticated graphical functions (e.g., three-dimensional (3D) rendering and 3D blending).

A "GPU-less cluster system" is a digital cluster system that does not have a GPU. Without a GPU, image transformation is tricky and causes artifacts. Applications that do not use a GPU use software libraries instead to render frame data. Rendering dynamic assets (such as a needle that provides a speed indication) using software rendering libraries is slow and may have aliased effects. Aliasing is the presence of jagged edges of curved surfaces and objects. A GPU-less cluster system should implement anti-aliasing to smooth out the jagged edges. One way of doing this is by blending the colors of the pixels around the object to create the illusion of smoothness.

Most digital instrument cluster systems are implemented using a GPU. If a GPU-less cluster system is used, graphics are rendered on each frame, which consumes many CPU cycles depending on the complexity of graphics operations. Also, on a GPU-less cluster system, it is difficult to achieve anti-aliasing while rotating assets for each angle.

A GPU-less cluster system has multiple assets (e.g., needle, dial gauges, telltale indicator signs, etc.). For example, to display the car's speed and RPM, an indicator needle is placed on the dial in a position according to the car's actual speed and RPM. Generally, a GPU-less cluster system can show a needle at intervals of one degree. A GPU-less cluster system may not have the capability to display needle positions at a finer granularity. As used herein, the term granularity corresponds to the frame rate of the animation such that the lowest granularity is the slowest frame rate, while the highest granularity is the fastest frame rate, which is also the desired frame rate during normal operation. Still, many assets are gathered, because, for example, an image is needed for every angle degree position from 1 to 360°. In one example, the total amount of assets can total between 100 megabytes (MB) and 400 megabytes of data. This is a difficult amount of memory to manage for a small cluster solution. As it is difficult to have this amount of data stored on raw files, the files may need to be compressed (compressing assets is also referred to as encoding assets) into something more manageable on the order of 20 MB. Typically, the assets are compressed into Portable Network Graphics (PNG) format.

One example performance indicator for cluster applications is the startup time. The startup time includes from when the cluster is first booted, to when the data is rendered on a display that depicts the current state of the particular cluster application (e.g., the actual engine temperature of the car). For a car dashboard cluster application, part of the startup process for a GPU-based cluster system and a GPU-less cluster system is performing an initial full sweep of the needle assets. When a car dashboard cluster application is initiated (e.g., when a person starts their car), the first thing that the cluster displays is the needles sweeping from a minimum position (typically the left-most point) to a maximum position (typically the right-most point), and then back from the maximum position (right-most point) to the minimum position (left-most point). Performing an initial sweep of the needles upon bootup evolved from legacy analog cluster systems. In older analog systems, the sweep was done as a self-test to check whether or not the system was working correctly. In a GPU-less cluster system, achieving a quick sweep is more challenging because the assets are large in size and the assets take a significant amount of time to decode after they have been compressed. Furthermore, in a GPU-less cluster system, using raw assets translates into increased load time, which in turn increases the time it takes to perform an initial sweep of the needles.

In an analog system, a sweep can automatically happen after powering the system on. In contrast, in a software based system, after the car is powered on, the software performs many functions before the sweep can take place (initializing the display, setup of system software, etc.). The time period between initial power on of the cluster and when the sweep of the needle is complete is variable, and is a performance indicator. The time period between bootup and the completion of the initial needle sweep should be kept as small as possible. A time period corresponds to an iteration of computer executable software. Thus, a retrieval of one of the plurality of subsets of dynamic assets corresponds to an iteration of computer executable software.

After the assets have been compressed, the compressed images can be decoded into raw data files. Decoding is time consuming with a standard PNG decoding process. As the full sweep should occur as early as possible during bootup, it is advisable to shorten the time it takes to do the decoding process of the images so that the dynamic assets (e.g., needles) are available for display. Thus, the disclosed methods include compressing the static asset and the plurality of subsets of dynamic assets offline into a separate asset image and storing into memory, decoding the compressed static asset prior to displaying the static asset, and decoding the compressed dynamic assets during the sequentially retrieving of each of the plurality of subsets of dynamic assets, and then displaying subsets as the subsets are decoded and available. The disclosed methods herein allow the system to perform a full sweep without having the full spectrum of decoded data.

The full sweep is done from the minimum position to the maximum position, and then back from the maximum position to the minimum position. Assume, in one example, that the range of the sweep is 0 (minimum) to 240 (maximum), and the integer positions are needed for display. The examples disclosed herein implement the fact that decoding the 240 positions would take too much time. If raw needles are used and are not compressed, then too much memory can be consumed. Therefore the assets are compressed and then decoded. A full sweep can be achieved performing the sweep without the full spectrum of assets during multiple iterations. The assets are decoded prior to rendering them onto a display.

The examples disclosed herein include implementing a GPU-less cluster system on an auxiliary core processor (such as a Cortex M4) executing a real-time operating system (RTOS). Assets are compressed in the Portable Network Graphics (PNG) format to reduce load time. A display is initialized, as is a controller area network (CAN) used for sensing. The system then starts to display early tell-tale indicators. The assets are loaded and decoded using a specific process through multiple iterations, initially at course granularity and then displayed as the assets become available at increasing levels of granularity. Example implementations of the disclosed examples have resulted in a GPU-less cluster system application to achieve an early sweep in 1.38 seconds.

FIG. 1 depicts a GPU-less system 100 showing the hardware components of a GPU-less cluster system 102. The GPU-less cluster system 102 is generally executing on a safe platform as the GPU-less cluster system 102 executes on a real-time operating system (RTOS) rather than a high-level operating system (HLOS) such as Linux or Android. An HLOS is more prone to failure.

As shown in FIG. 1, the GPU-less cluster system 102 includes a general purpose central processing unit (CPU) 104 that executes a real-time operating system (RTOS), digital signal processor (DSP) 106, CAN interface 108, internal memory 110, display controller subsystem 112, peripherals 114 and external memory controller 116. In this example, these parts are bidirectionally connected to a system bus 118. Note that, a GPU-based cluster would have all the same components, and in addition, would have a graphics processing unit (GPU) to perform image synthesis and display oriented operations used for manipulation of the data to be displayed. Continuing with the description of the GPU-less system 100, the general purpose central processing unit (CPU) 104 typically executes what is called control code. DSP 106 typically operates to process images and real-time data. These processes are typically referred to as filtering. Processes such as geometric correction are performed by DSP 106. CAN interface 108 interfaces with the CAN 126. Attached to the CAN 126 are various sensors 124 that obtain external information (in the case of a car application, information about engine temperature, speed, etc.). Internal memory 110 stores data used by other units and may be used to pass data between units. Internal memory 110 also includes several computer executable components that execute the full sweep process. Internal memory 110 may be a video dynamic random access memory (VDRAM). The existence of internal memory 110 on the GPU-less cluster system 102 does not preclude the possibility that general purpose CPU 104 and DSP 106 may include an instruction and data cache. Display controller subsystem 112 sends data buffers to the display 120. Peripherals 114 may include various parts such as a direct memory access controller, power control logic, programmable timers and external communication ports for exchange of data with external systems. External memory controller 116 controls data movement into and out of external memory 122. The other CPU 128 executes instructions to coordinate activities by the various processing units within the GPU-less system 100.

The methods and apparatus for completing a full asset sweep can be implemented on GPU-less cluster system 102. The internal memory 110 of the GPU-less cluster system 102 is configured to store compressed preprocessed assets, the assets having been compressed and preprocessed offline to provide simulated GPU graphical effects. The general purpose CPU 104 of the GPU-less cluster system 102 is configured to execute a variety of computer executable components that are stored in internal memory 110. The computer executable components stored in internal memory 110 of the GPU-less cluster system 102 include a retrieval component configured to sequentially retrieve each of a plurality of subsets of dynamic assets such that each subset provides position indicators with a different level of position granularity, such that the order of retrieving each subset moves from a lowest granularity subset to a highest granularity subset until all of the plurality of subsets of dynamic assets have been retrieved. A sweep component is configured to perform a full sweep, prior to retrieving of all of the dynamic assets, by sequentially displaying dynamic assets from a minimum position value to a maximum position value of the static asset, and back from the maximum position to the minimum position value of the static asset, the sequential displaying being based on the highest available granularity of dynamic asset that has been retrieved during the sequentially retrieving. The internal memory 110 of the GPU-less cluster system 102 also includes a mapping component configured to map the dynamic assets to a position on the static asset using a mapping operation while one subset of the plurality of subsets of dynamic assets is being retrieved, and an updating component configured to update a parameter of the mapping operation after one subset has been retrieved such that the mapping operation will retrieve the dynamic assets at a finer level of granularity during the sequentially retrieving of a next subset of the plurality of subsets of dynamic assets. The display controller subsystem 112 includes a display component configured to display a static asset as background for the displaying of dynamic assets that represent position indicators that point to different position values on the static asset.

The disclosed examples can be implemented within a system on a chip (SoC). An SoC is one chip solution that embeds into itself multiple functionalities. Given a processing core, interfaces are needed in order for the SoC to connect to memory such as VDRAM. By contrast, a laptop or computer uses a motherboard. An SoC houses the functionality inside of one chip, including the CPU processing power, as well as the RAM interfacing. The price of the SoC depends on its functionality. The price of an SoC with a GPU can be greater than the price of an SoC without a GPU. The examples disclosed herein can be extended to an SoC, and in particular, to 1) SoCs that do not have a GPU, and 2) SoCs in which the software does not have control of the GPU. The examples disclosed herein can be implemented on a single SoC such that a GPU-less cluster subsystem and a GPU-based cluster subsystem are implemented on the same SoC. The SoC may be configured to display data rendered by the GPU-less cluster subsystem when the GPU is not available, and to display data rendered by the GPU-based cluster subsystem when the GPU is available. In other examples, the GPU-less cluster subsystem and the GPU-based cluster subsystem can be implemented on different SoCs. Still, in examples where the GPU-less cluster subsystem and the GPU-based cluster subsystem are implemented on different SoCs, the GPU-less cluster subsystem may still be implemented as a fail-safe fallback mechanism such that the system displays the data rendered by the GPU-less cluster subsystem when the GPU is unavailable and switches to displaying data rendered by the GPU-based subsystem when the GPU becomes available.

Figure 2:
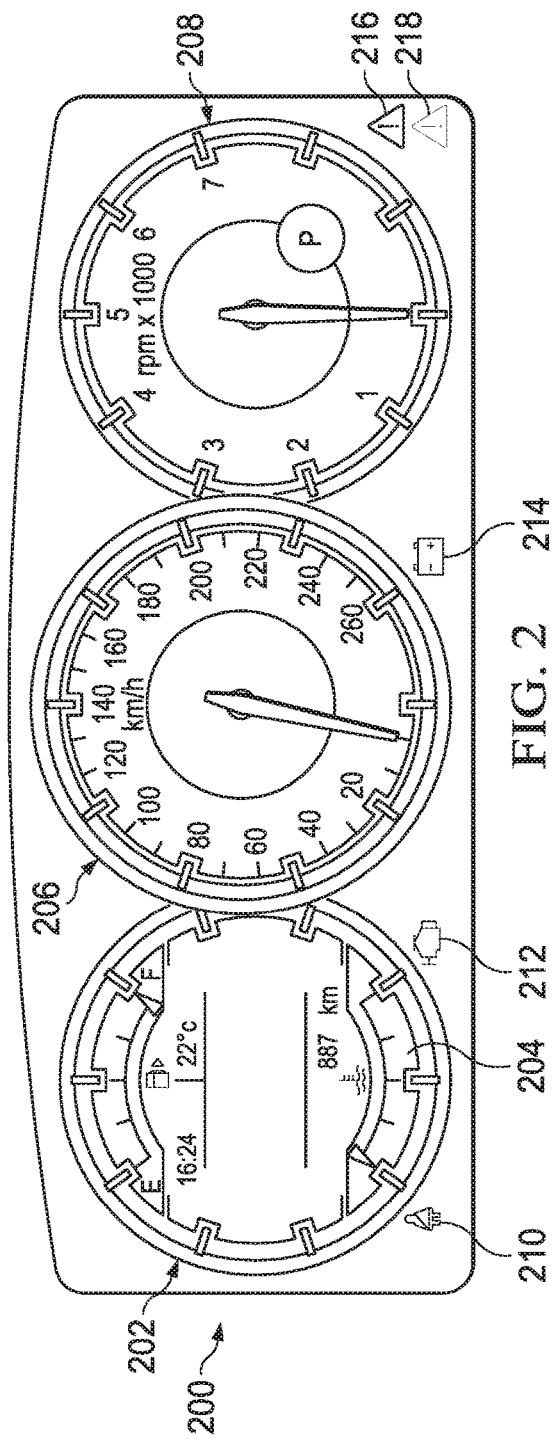
FIG. 2 shows an example 3D digital instrument cluster system implementing a car dashboard application using a GPU-based cluster system.

FIG. 2 shows an example digital instrument cluster system 200 implementing a car dashboard application. In this example digital instrument cluster application, dials and needles are needed to display fuel level 202, coolant temperature 204, speed 206, and engine revolutions per minute (RPM) 208. Other tell-tale warning signs are provided in this example, including the seat belt indicator 210, check engine or malfunction indicator light 212, battery/charging alert 214, and other warning indicators 216, 218.

Figure 3:
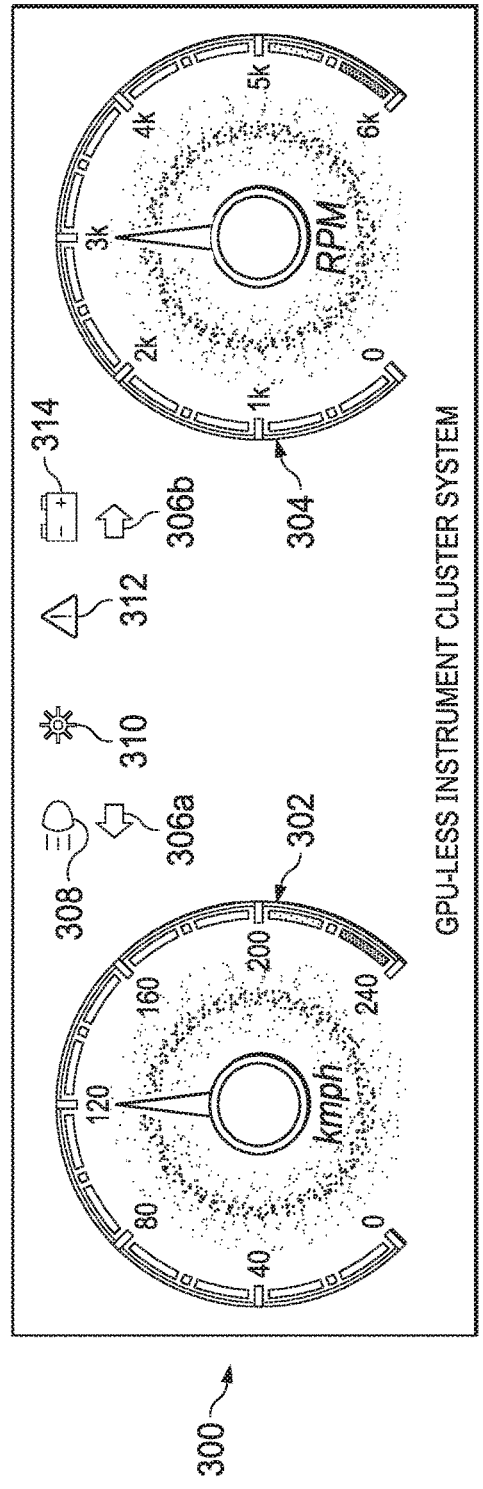
FIG. 3 depicts an example 3D digital instrument cluster system implementing a car dashboard application using a GPU-less cluster system.

FIG. 3 depicts an example 3D digital instrument cluster system 300 implementing a car dashboard application using a GPU-less cluster system. The GPU-less cluster system rendering has a slightly different look and feel than the example digital instrument cluster system 200 rendering shown in FIG. 2, but similar information is displayed. In the example shown in FIG. 3, a dial and a needle illustrate the speed of the car 302, and the engine revolutions per minute 304. Included in the panel of other warning indicators are left 306a and right 306b turn signals, bright light indicator 308, a lamp out indicator 310 (that indicates that there is an exterior light on the vehicle that is not functioning properly), a general warning indicator 312, and a battery indicator 314. The goal is for the GPU-less digital instrument cluster system to have a similar look and feel as that of a GPU-based digital instrument cluster system, so that the GPU-less digital instrument cluster system can be used as a backup mechanism (e.g., a fail-safe fallback mechanism) in case the GPU-based digital instrument cluster system fails, becomes unavailable or does not exist.

Figure 4:
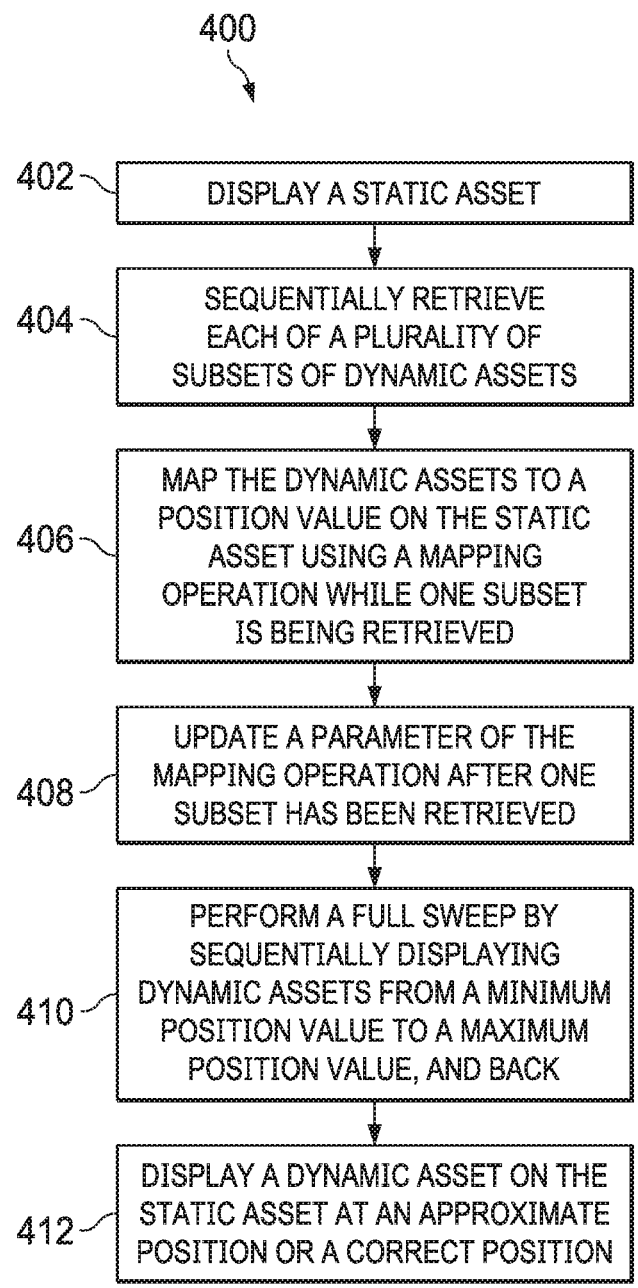
FIG. 4 is flowchart illustrating a method for implementing a full sweep of dynamic assets.

FIG. 4 is flowchart 400 illustrating a method for implementing a full sweep of dynamic assets. Static assets are assets that do not change, while dynamic assets are assets that change. For example, in a car dashboard cluster application, static assets would be the dial and telltale indicator assets, while dynamic assets would be the needles used for displaying parameters in a car dashboard instrument cluster. The below process can be executed by a computer executable component within the internal memory 110 of the GPU-less cluster system 102 of FIG. 1. At 402, a static asset is displayed as background for the displaying of dynamic assets that represent position indicators that point to different position values on the static asset. Static assets are also the easiest to display, so they are displayed first. At 404, each of a plurality of subsets of dynamic assets are sequentially retrieved. Each subset provides position indicators with a different level of position granularity. The order of retrieving each subset moves from a lowest granularity subset to a highest granularity subset until all of the plurality of subsets of dynamic assets have been retrieved.

At 406, the dynamic assets are mapped to a position value on the static asset using a mapping operation while one subset of the plurality of subsets of dynamic assets is being retrieved. The mapping operation may be a modulo operation. At 408, a parameter of the mapping operation is updated after one subset has been retrieved (e.g., updating a parameter of the modulo mapping operation after one subset has been retrieved) such that the mapping operation will retrieve the dynamic assets at a finer level of granularity during the sequentially retrieving of a next subset of the plurality of subsets of dynamic assets. For example, if the mapping operation is a modulo operation, and the parameter was mod8, updating a parameter of the mapping operation would mean, for example, changing the mod8 operation to be a mod4 operation.

At 410, a full sweep is performed, prior to retrieving of all of the dynamic assets, by sequentially displaying dynamic assets from a minimum position value to a maximum position value of the static asset, and back from the maximum position to the minimum position value of the static asset. The sequential displaying is based on the highest available granularity of dynamic asset that has been retrieved during the sequentially retrieving. The full sweep starts after a first subset of the dynamic assets has been retrieved, and continues concurrently with the sequential retrieving of each of a plurality of remaining subsets of dynamic assets.

At 412, a dynamic asset is displayed on the static asset at an approximate position or a correct position. The dynamic asset is displayed on the static asset at an approximate position that approximates a correct position after the full sweep is completed, and prior to when each of the plurality of subsets of dynamic assets has been retrieved. The dynamic asset is displayed at a correct position on the static asset corresponding to a value detected by a sensor after each of the plurality of subsets of dynamic assets has been retrieved. The static assets are rendered on one layer at a first frame per second (fps) frequency. Static assets include gauge assets, background assets, and tell-tale indicators that do not change their indication often. The dynamic assets (such as the needles) are rendered on a second layer at a second fps frequency (the industry standard for automotive applications is 60 fps). The second fps frequency for rendering the dynamic assets is greater than the first fps frequency for rendering the static assets. Dynamic assets change their position much more frequently.

During the method performed by FIG. 4, the static and dynamic assets that are needed are identified. In a car dashboard cluster application, the assets that are identified include the telltale indicators, static dials and gauges, and various needle positions. A separate needle asset is needed for every degree position along an arc. In addition, before the static and dynamic assets are retrieved, assets are pre-processed offline to provide simulated GPU effects. The preprocessing may include, for example, the simulation of a Porter-duff blending operation. Also, prior to being retrieved, the assets are compressed into a separate image, by for example using PNG format. For example, if a raw image is 200 megabytes (MB), it is compressed in PNG format to 25 MB. Compressing the assets reduces the time it takes to load the assets from storage during the decoding state. There is a tradeoff between the time it takes to compress and load the assets, and the time it takes to do a full decode of the assets. Also, the compressed static assets are decoded (decompressed) prior to the display of static assets 402. Also, the dynamic assets are decoded (decompressed) concurrently with the dynamic assets being retrieved at 404.

Figure 5A:
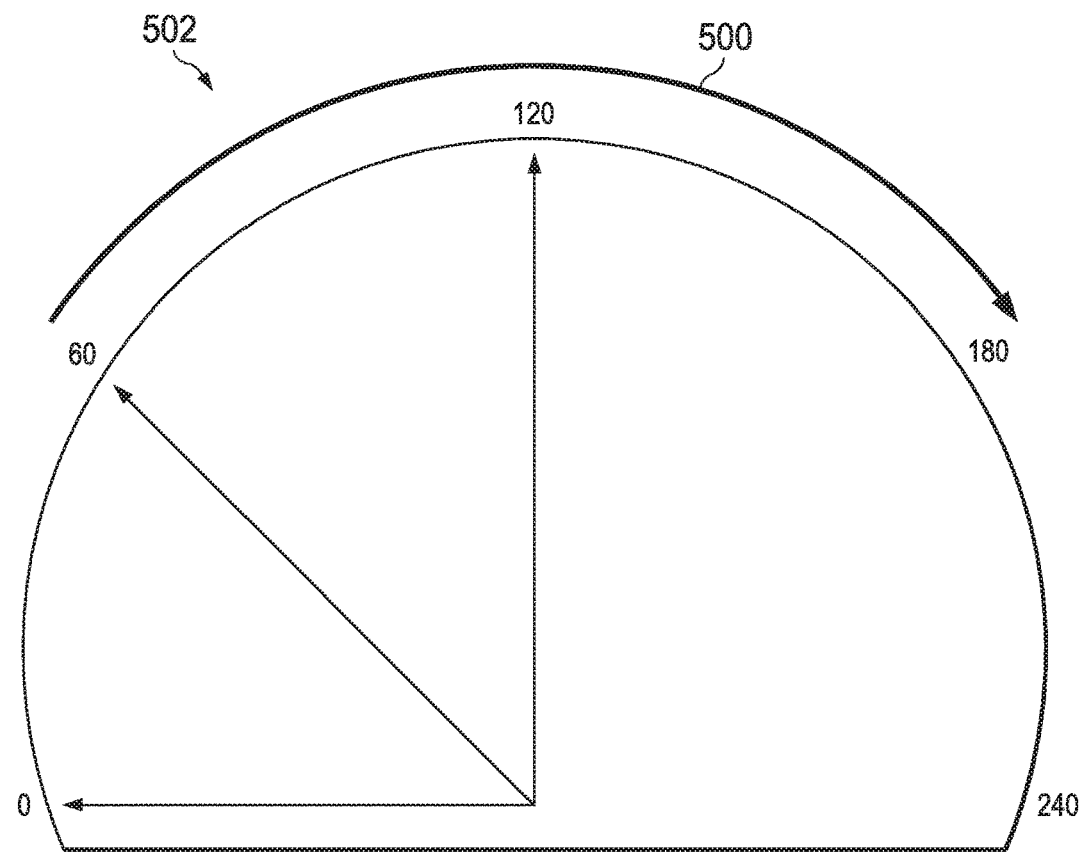
FIG. 5A depicts an example visualization of implementing the first half of a full sweep of dynamic needle assets on a car dashboard.
Figure 5A:
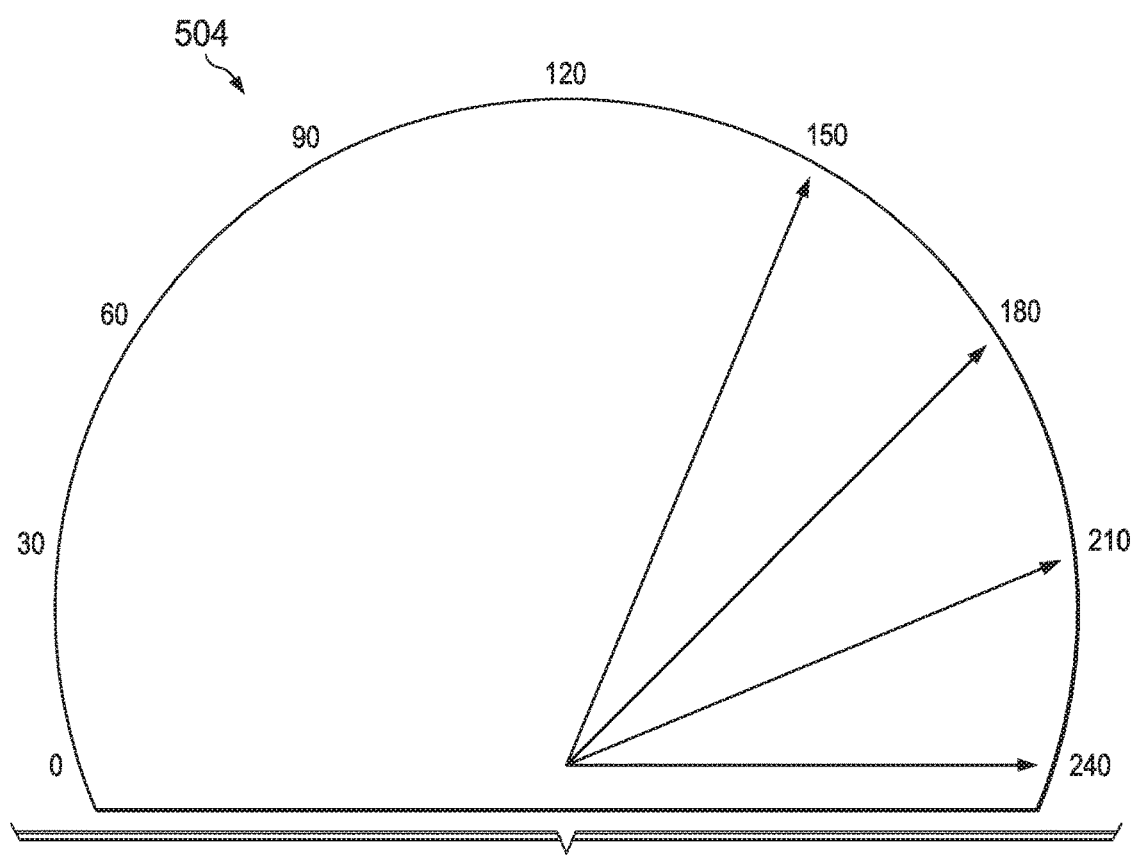
Figure 5B:
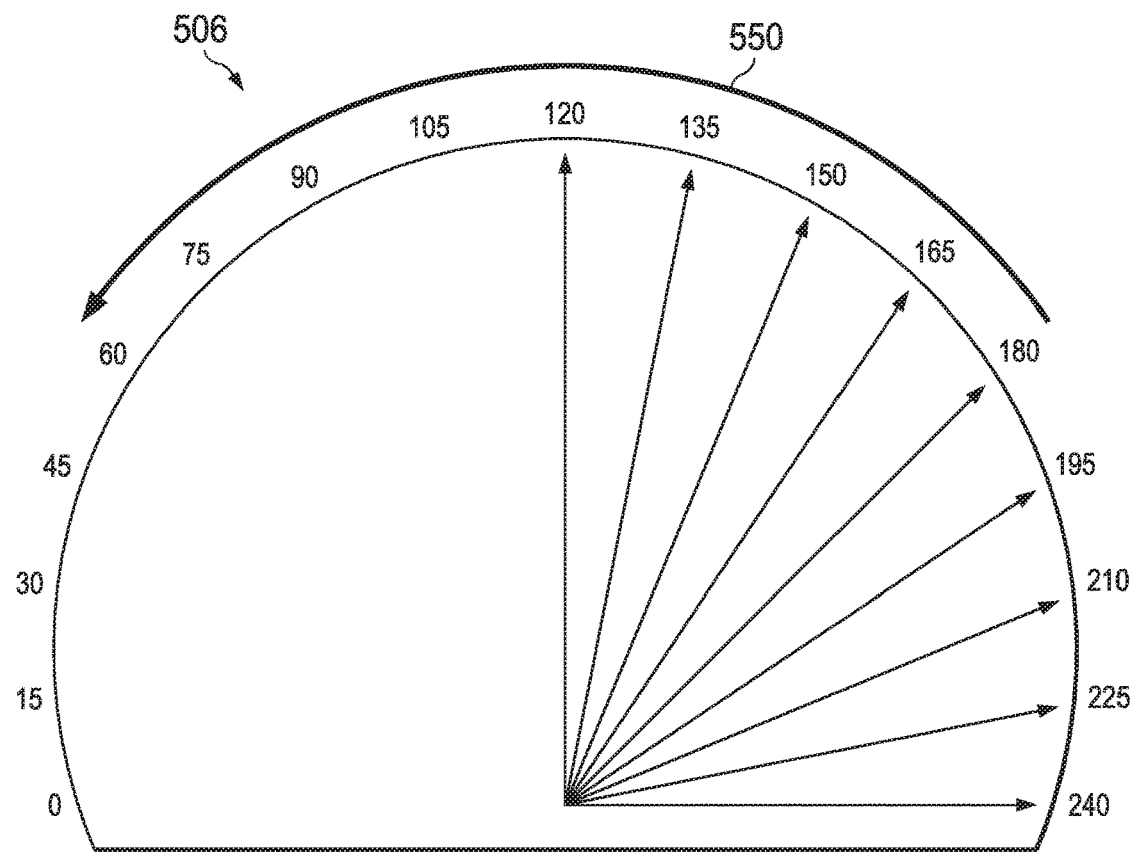
FIG. 5B depicts an example visualization of implementing the second half of a full sweep of dynamic needle assets on a car dashboard.
Figure 5B:
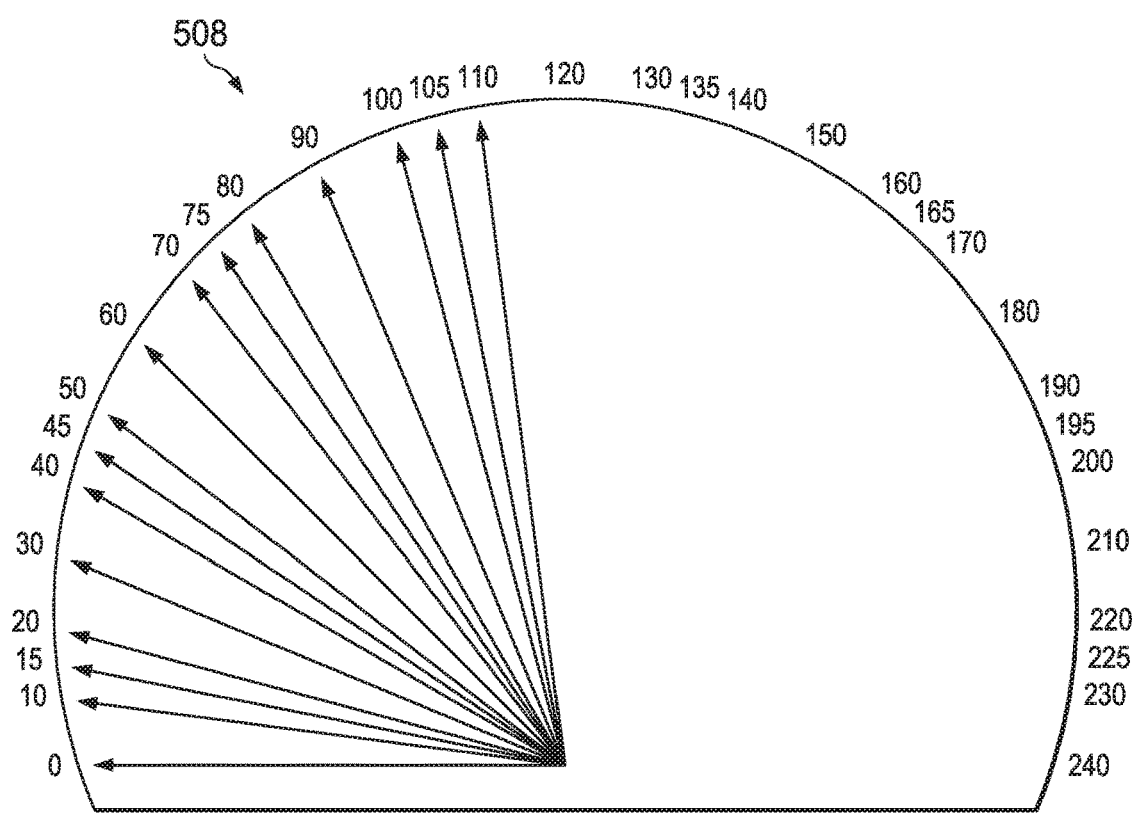

FIGS. 5A-5B depict an example visualization of the retrieving of needle assets at increasing levels of granularity on a car dashboard. FIGS. 5A-5B depict an example of performing a full sweep of the needle assets. Accordingly, FIGS. 5A-5B depict a practical and motivating example of the examples disclosed herein, as the examples disclosed herein can be applied to any type of system for displaying static and dynamic assets. FIG. 5A depicts performing one-half of the sweep 500 from a minimum position of 0 to a maximum position of 240, while FIG. 5B depicts completing the sweep 550 by returning from the maximum position of 240 to the minimum position of 0. In this car dashboard example, assume 33 assets are to be decoded and available. More assets are available after each iteration because each iteration retrieves an additional subset of assets. In this example, after the first iteration 502 (in this example, modulo 4), a subset with a total of five assets have been decoded and retrieved, each spaced 60 degrees apart. Thus, during the first part of the first half of the sweep, needles are shown to the driver at the 0, 60, and 120 positions. The full sweep can be performed after each iteration, including the first iteration using just asset positions 0, 60, 120, 180, and 240. However, as the assets are decoded and retrieved concurrently with the performing of the full sweep, assets at finer levels of granularity are able to be displayed while the full sweep is taking place. In this example, after the second iteration 504 (in this example, modulo 8), nine assets have been decoded and retrieved, each spaced 30 degrees apart. Now more assets are available, namely asset positions 150 and 210. Thus, during the second part of the first half of the sweep, needles are shown to the driver at the 150, 180, 210, and 240 positions. The process continues during the second half of the sweep when sweeping from the maximum position 240 back to the minimum position 0. In particular, after the third iteration 506 (in this example, modulo 16), a total of 17 assets have been decoded and retrieved, each spaced 15 degrees apart. After the third iteration, new assets 135, 165, 195, and 225 are made available. Thus, during the first part of the second half of the full sweep, needles are shown to the driver at the 240, 225, 210, 195, 180, 165, 150, 135, and 120 positions. After the final iteration 508 (in this example, modulo 24), a total of 33 needle positions are available (note that positions 105, 75, 45, and 15 were already retrieved during the third iteration 506, so they are available for display to the driver during the second part of the second half of the sweep). Thus, during the second part of the second half of the full sweep, needles are shown to the driver at the 110, 105, 100, 90, 80, 75, 70, 60, 50, 45, 40, 30, 20, 15, 10, and 0 positions. The full sweep is available after each iteration, but the method can be configured to display finer levels of granularity depending on a configurable tradeoff between granularity of shown needle positions and time to perform the full sweep.

Figure 6:
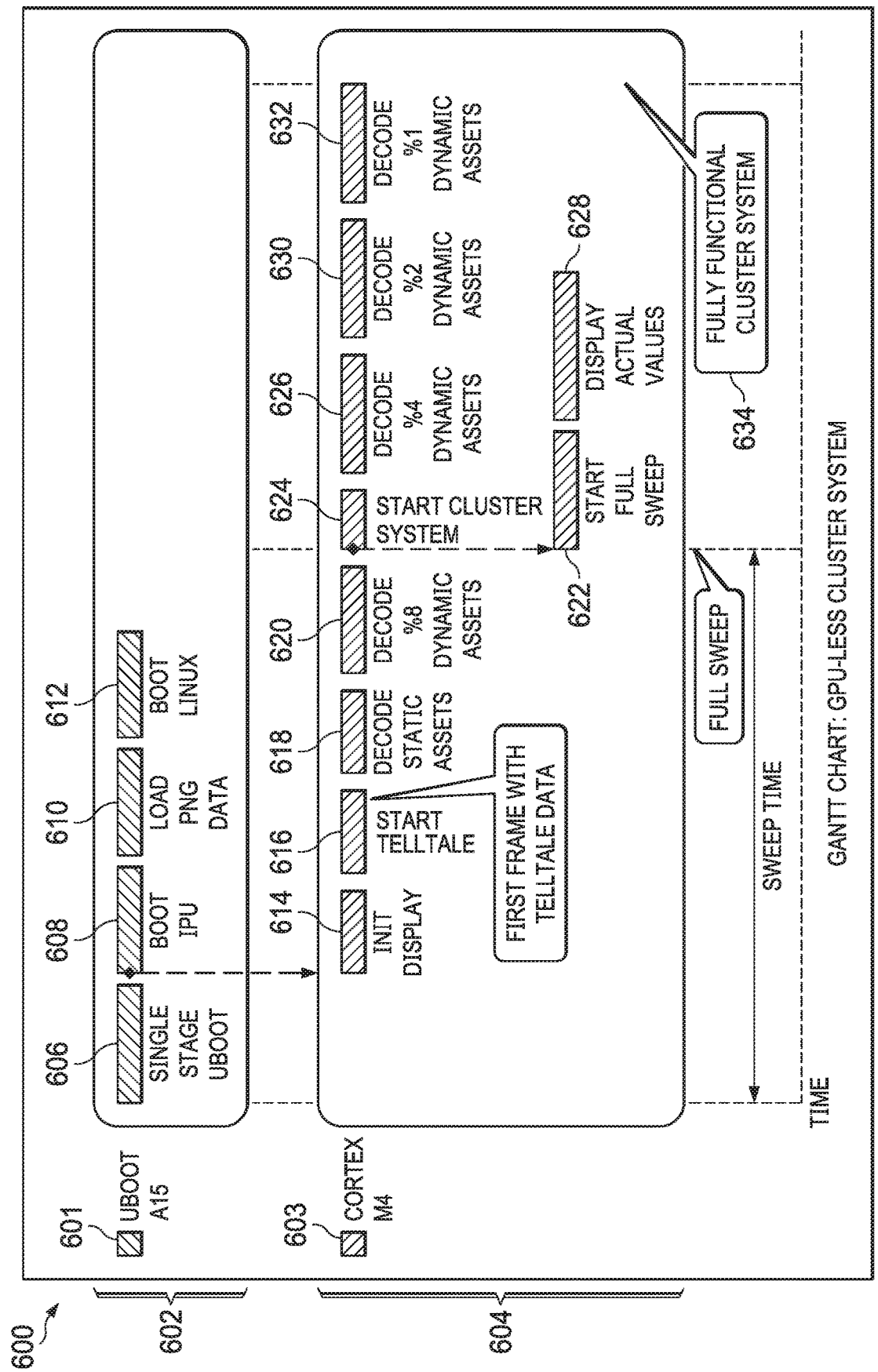
FIG. 6 is an example Gantt chart illustrating a detailed boot flow of a GPU-less cluster system.

FIG. 6 is an example Gantt chart illustrating a boot process 600 of a GPU-less cluster system. The boot process 600 can be executed on a system on a chip (SoC). Two separate processors 601, 603 can be used during the boot process. In a car dashboard cluster application, when the car is started, the system is powered on, the software booted, and a configuration process is started. The process is divided into two threads, one for booting the image processing unit and the operating system (thread 602), and another for retrieving, decoding and displaying the cluster application data (thread 604). One of the processors (e.g., an A15) is used for one of the threads (thread 602), while another processor (e.g., a cortex M4) is used for the other thread (thread 604).

Thread 604 involves retrieving, decoding and displaying the static and dynamic assets. Just after bootup, the system performs a display initialization 614 of the cluster application. Display initialization 614 involves a number of commands and system calls to connect the display to the system. In particular, the display is powered on, configured, given specifications for display resolution, and given an indication that the display receives data that can be displayed at a certain resolution and at a certain position. The process then proceeds to the start telltale stage 616. Telltale indicators (e.g., for a car dashboard application, seatbelt warning, engine warning, temperature warning) are the easiest graphics to display. This is because the telltale indicators are small in size and as a result, take relatively little time to decode. Thus, after the hardware is set up, the telltale indicators are decoded 616. After the telltale indicators are decoded, then they are rendered onto the display. The first items the user sees on the display are the telltales. Showing the telltales early is typical in the automotive industry, because users (e.g., drivers) generally like to see the telltale signs come up as soon as possible.

After the telltale indicators are displayed 616, decoding compressed static assets 618 (e.g., dials) begins. The dynamic assets (e.g., needles) are decoded in different iteration stages. In the example shown in FIG. 6, there are four decoding stages (first iteration 620, second iteration 626, third iteration 630, and fourth iteration 632). The sub-process for decoding the dynamic assets is configurable, as the dynamic assets can be decoded in more than four stages. After each decode iteration, the error representing the actual state of the system (e.g., car parameters) and where the dynamic assets can be positioned decreases. This is because after each iteration more dynamic assets are available, and the granularity at which the dynamic assets can be displayed is greater.

After each iteration, including the first iteration, a full sweep is possible. However, the more iterations that have taken place, the smoother the sweep can be because of the incremental increase in available granularity of the dynamic assets. As a sweep is possible after the first iteration, the full sweep 622 starts after the first iteration 620, where decoding compressed dynamic assets is first performed). In the example shown in FIG. 6, the iterations (first iteration 620, second iteration 626, third iteration 630, fourth iteration 632) are based on a modulo logarithmic operation, though other mapping operations are possible. An operation that incrementally increases the granularity of the number of dynamic assets that are decoded is possible. In the example shown in FIG. 6, the first modulo operation is 8. This means that if dynamic assets from 0 to 240 are to become available, then after the first iteration, the assets at position 0, 8, 16, 24 . . . 232, 240 (each 8 degrees apart) can be available. After the second iteration 626, assets at position 0, 4, 8, 12 . . . 232, 236, 240 (each 4 degrees apart) can be available. After the third iteration 630, assets at position 0, 2, 4 . . . 236, 238, 240 (each 2 degrees apart) can be available. After the fourth iteration 632 (in this example, the fourth iteration 632 is the final iteration), the asset at each position (each 1 degree apart) can be available (the full set of assets can be available). The cluster is fully functional 634 after the fourth iteration 632 (which in this example is the final iteration) and there is no error. The sweep is started 622 after the first mod8 iteration 620. The mod4 iteration 626 is begun as the first sweep is taking place. In an example where 240 asset positions are displayed, the full sweep 622 is begun after 240/8=30 assets have been decoded 620. If the time it takes to decode each asset is 30 milliseconds (ms), then it can take 900 ms plus whatever time is takes to do the sweep before the actual speed can begin to be displayed 628. As the mod4 iteration 626 is begun before the asset sweep is completed, the asset sweep can include slightly more than 30 assets (e.g., needles). While the sweep is taking place, assets are continuing to be decoded (626, 630, 632) as much as possible.

There are two separate central processing units (CPUs) on the chip. The boot process 600 shows two separate process threads (thread 602 and thread 604). Thread 602 is executed on a first high performance processor such as an A15 601, while thread 604 is executed on second processor such as a cortex M4 603. The bootloader, corresponding to thread 602, loads the asset data concurrently with the firmware image booting. The firmware booting corresponds to thread 602. The processors 601, 603 are loaded concurrently. For example, when the cortex M4 processor 603 is loaded, the software to do display initialization 614 and the start telltale stage 616 is being loaded. The raw data is initially, for example, 350 MB, and after compression, the PNG data 610 can be approximately 25 MB. Loading 25 MB of data can also take time. This is why the software for the display initialization 614 and the start telltale stage 616 portions are loaded separately from the loading of the PNG data 610. Thus, while the software performs display initialization 614 and the start telltale stage 616, the PNG data is being loaded 610 concurrently. The basic software (display initialization 614, start telltale stage 616) is loaded separately from the PNG data 610 for the cluster.

Thread 602 begins with a single stage boot 606, followed by an image processing unit (IPU) boot 608, followed by loading the PNG data 610, followed by booting Linux 612. Thread 604 begins by display initialization 614. Display initialization 614 begins concurrently with the IPU boot 608. The IPU is configured to perform image analysis, filtering, format conversion, and compression and decoding of assets. Following display initialization 614, thread 604 performs the start telltale stage 616 up to displaying a first frame with telltale data. Then, the decoding compressed static assets 618 (e.g., dials) begins. Assuming that the assets are decoded in reverse direction (e.g., the asset at position 236° is available before the asset at position 4° is available), then the full sweep can be able to include the asset at a later position (e.g., the 236° position). This is because the mod4 iteration stage 626 is started before the full sweep 622 is complete. After the full sweep 622 is done, the sensor data is displayed 628 with the actual values (e.g., speed, rpm, etc.) Following starting the cluster 624, assets are decoded in a mod4 stage 626, followed by decoding the assets at a mod2 stage 630, and then lastly decoding the assets at a mod1 stage 632. When thread 604 is complete, the GPU-less cluster system should be fully functional 634. During each modulo iteration stage, the position of the asset is approximated so that the actual position of the asset is approximated to be the closest available asset that has been decoded. While actual speed, rpm, etc. is being displayed 628, the actual display error decreases as the number of assets being decoded increases during the mod4 626, mod2 630, and mod1 632 stages. For example, decoding at the stage mod4 626 reduces the error by half, and the decoding at the stage mod2 630 reduces the error by further half. The time it takes from performing the single stage boot 606, to the time when the cluster is fully functional 634, is in one example 7.5 seconds.

The concurrent processing as shown in FIG. 6 within thread 604 achieves efficiency within the system. Assume, in one example, that to decode a single asset position takes 30 milliseconds, and that 240 different asset positions are decoded. In that case, it can take 240×30 ms=7200 milliseconds, or 7.2 seconds to decode the dynamic assets. During this time, there is no concurrent processing resulting in a stagnant process that is not performing actions. This is not acceptable, because when the car is started the full sweep should happen as soon as possible. In the example where the first iteration is mod8, 240/8+1=31 assets are shown after 31*30 milliseconds, or 930 ms. Then, a sweep can be performed after 930 ms rather than 7200 ms.

Note that, as shown in the Gantt chart in FIG. 6, display of the actual values 628 corresponding to a real-time position happens before system startup is fully completed after the fourth iteration 632. To illustrate that the accuracy of the display of the actual real-time position (e.g., the actual speed the car is moving) also increases after each iteration, assume in one example that a speed of 7 miles per hour (mph) is to be displayed on a dial that ranges from 0 mph to 240 mph. The first iteration may be a mod10 iteration, and therefore may decode needles at the 0, 10, 20 . . . 230, 240 positions. To approximate the actual speed of 7 mph, the needle can be displayed at the 10 mph position and have 3 mph of error. Then, the second iteration may be a mod5 iteration and so the needles in between the existing positions would be decoded and available, namely at the 0, 5, 10, 15, 20 . . . 235, 240 mph positions. As the 5 mph position is closer to 7 mph than the 10 mph position, the needle can be displayed at the 5 mph position with 2 mph of error when approximating the actual speed of 7 mph. Another iteration may be a mod2 iteration, and would therefore provide for availability the needles at the 0, 2, 4, 6, 8, 10 . . . 238, 240 mph positions. In that case, either the 6 mph or 8 mph position would be displayed for the 7 mph position with 1 mph of error. In the last iteration, the full set of degree positions would be displayed, from 0, 1, 2, 3, 4, 5, 6, 7 . . . 239, 240°. Then, the actual speed of 7 mph would be displayed and with no error. During each iteration, the gaps between the already decoded needle positions are filled in.

Below is pseudocode to implement a multi-stage asset decoding process for early sweep in a GPU-less cluster system:

```
     Input: assets, N
     Output: raw
 1:  interval := 8
 2:  while interval >= 1 do
 3:      start := interval
 4:      if start == 8 then
 5:          start := 0
 6:      end if
 7:      for i = start to N step interval do
 8:          Load(assets[i])
 9:          Raw[i] = Decode(assets[i])
10:          for j in 1 to interval do
11:              Raw[i + j] = Raw[i]
12:          end for
13:      end for
14:      interval := interval / 2
15:  end while
```

Figure 7:
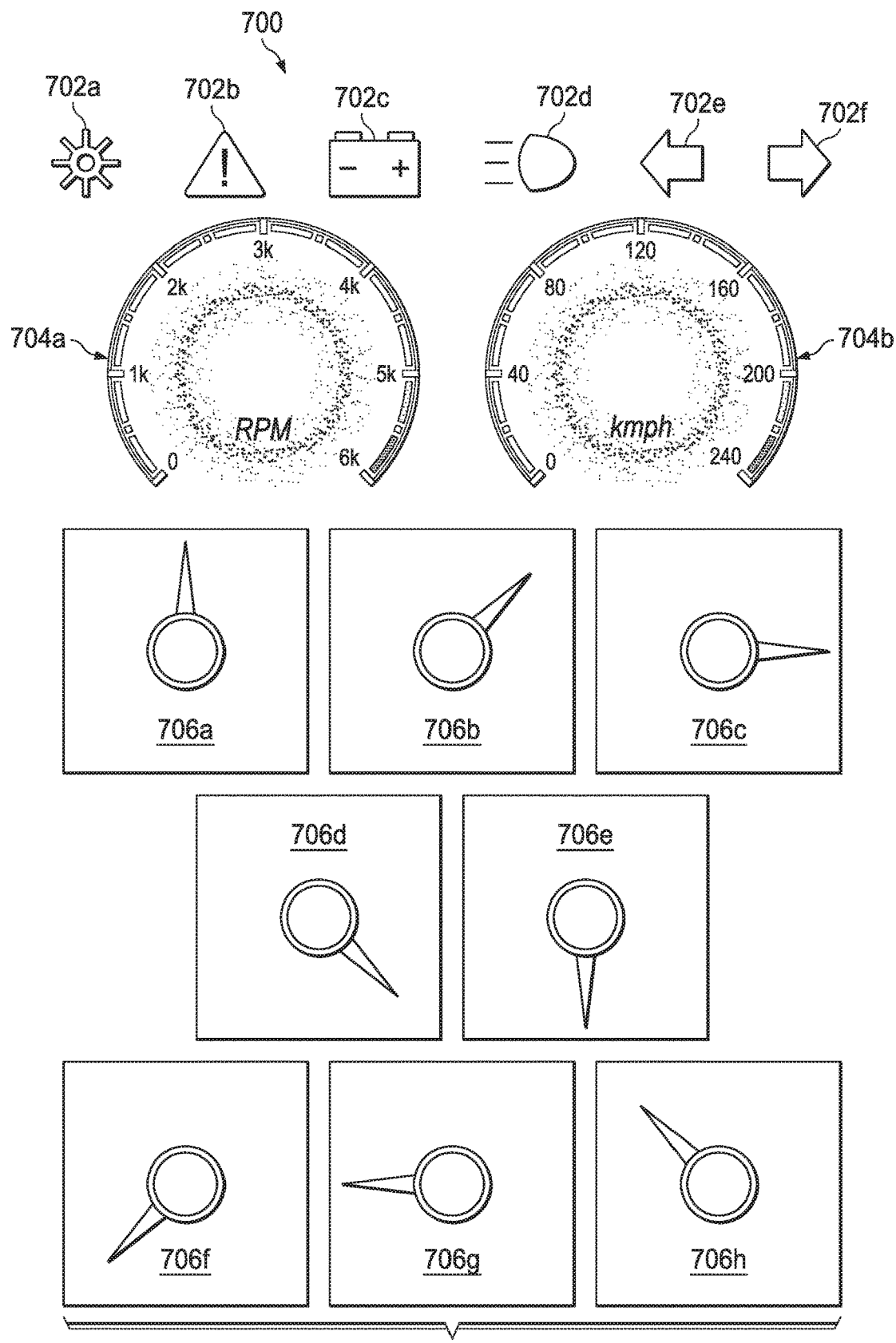
FIG. 7 is an example collection of assets that are retrieved and decoded during boot-up of a GPU-less cluster system.

FIG. 7 is an example collection of assets 700 identified during preparation of assets. The preprocessed collection of assets 700 are loaded into internal memory 110. Identified are the telltale indicators (lamp out indicator 702*a*, general warning indicator 702*b*, battery signal 702*c*, bright lights indicator 702*d*, left hand turn signal 702*e*, right hand turn signal 702*f*), static dials (RPM 704*a* and kmph 704*b*), and eight different needle positions 706*a-h* spaced 45 degrees apart along 360 degrees. Eight needle positions are depicted by 706*a-h*, however a separate needle asset is needed for every degree position along 360 degrees. The static assets (namely 702*a-g* and 704*a-b*) are compressed using a suitable format such as PNG. The dynamic assets including needle positions 706*a-h* are also compressed using a suitable format such as PNG. Two different layers are used to render the assets onto a display. The static assets (namely 702*a-g* and 704*a-b*) are rendered on one layer with a low frame per second (fps) frequency, while the dynamic assets (needle positions 706*a-h*) are rendered on another layer with a higher fps frequency. A direct memory access (DMA) operation is used to copy static assets (such as 702*a-g* and 704*a-b*) and dynamic assets (such as 706*a-h*) to their correct position onto a display.

Figure 8:
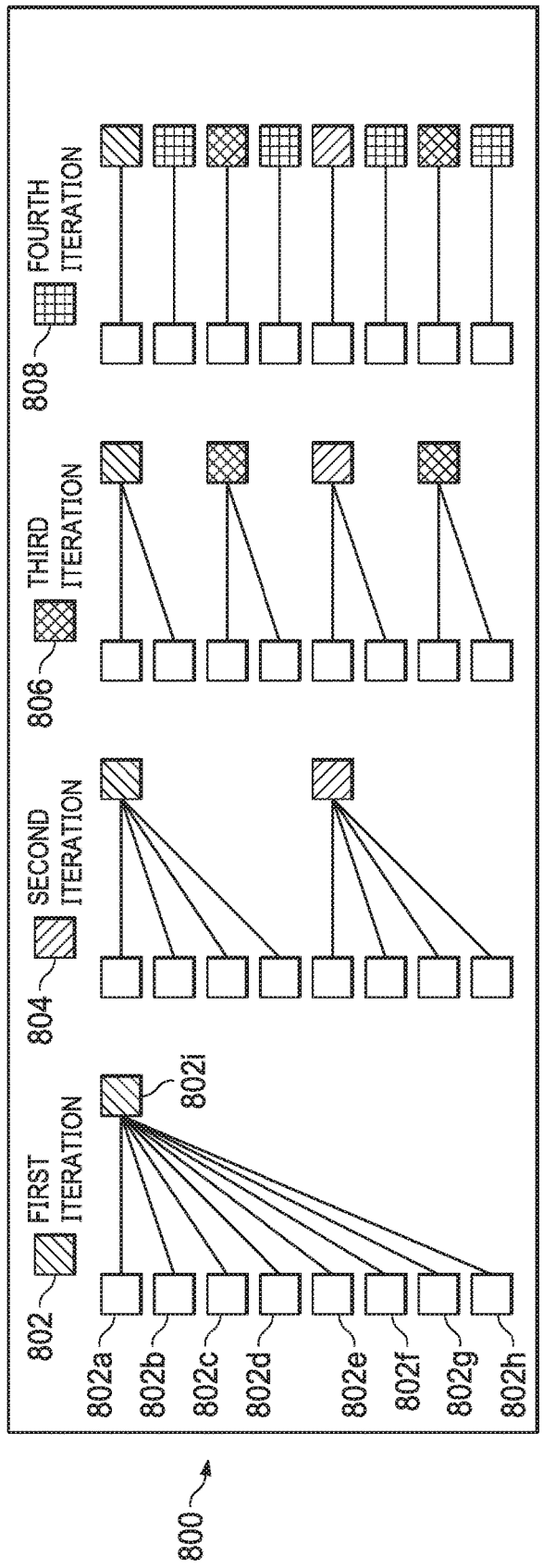
FIG. 8 is an example visualization of retrieving assets at increasing levels of granularity.

FIG. 8 is an example visualization 800 of retrieving assets at increasing levels of granularity. FIG. 8 is a generalization of the method as the method can be used for a system where a full sweep of dynamic assets is needed, not just a car dashboard display system. As shown in the example, there are 8 needed positions 802*a-h* that need to be retrieved and decoded within a particular subset of all the dynamic assets that need to be retrieved (e.g., if 240 needle positions are needed, needed positions 802a-h would be the positions needed for 30, 60, 90, 120, 150, 180, 210, and 240, or a subset of all the needed positions). This example uses a modulo mapping operation to achieve finer levels of granularity at every iteration. Every iteration represents a time period when assets are available. The first iteration 802 represents the mod8 stage. Because there are 8 needed assets, after the first iteration, 8÷8=1 asset 802i is decoded and available. Thus, the 1 available asset is virtually used for needed positions 802a-g, and is the actual asset used for displaying on 802h (or on any of 802a-802h). The second iteration 804 represents a mod4 stage, so after the second iteration, 8÷4=2 assets have been decoded and are available. The two assets that are available after the second iteration are virtually used for asset positions 802b-d and 802e-g, respectively, and are the actual assets used for displaying on 802a and 802h (though they can be used for any of 802a-d, or 802e-h, respectively). The third iteration 806 represents a mod2 stage, so after the second iteration, 8÷2=4 assets have been decoded and are available. The four assets that are available after the third iteration are virtually used for needed positions 802a-b, 802c-d, 802e-f, and 802g-h, respectively, and are the actual assets used for displaying on 802a, 802c, 802e, and 802g, respectively (though they can instead be used for 802b, 802d, 802f, and 802h, respectively). The fourth and final iteration 808 represents a mod1 stage. During the mod1 stage, 8÷1=8 assets are available for the needed positions 802a-h. In this example, each iteration is modulo logarithmic base 2, though a type of mapping operation and operator parameter combination can be used where the number of assets are increased with finer granularity after every iteration, including where the base of the logarithm changes (e.g., first iteration would be log base 2, while the next iteration is log base 3, etc.)

Figure 9:
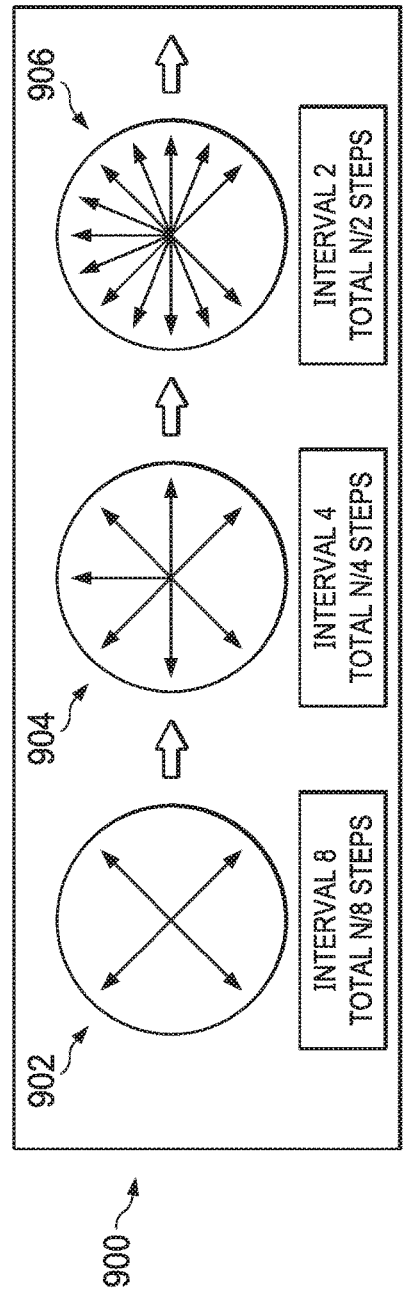
FIG. 9 is another example visualization of retrieving assets at increasing levels of granularity.

FIG. 9 is another example visualization 900 of retrieving/decoding assets at increasing levels of granularity. FIG. 9 depicts decoding assets for an application where assets are decoded and become available for a circular display. There are multiple stages of asset decode. Three of these stages are shown in FIG. 9, namely 902, 904 and 906. Though there are multiple stages of asset decode, after each stage, a full sweep can be performed.

The first iteration of the process is shown at 902. The first iteration 902 is the mod8 stage 902, during which a total of N/8 decoded assets are produced. As shown in FIG. 9, after the first iteration 902, four of the assets have been decoded. With just these four asset positions, a sweep can be done by showing the assets at the four different positions. However, particular asset values (e.g., the speed of a car) are not able to be shown because the asset for that position may not be ready. The most nearby asset that has been decoded can be shown instead. Thus, error is most significant after just performing one iteration. In the next iteration, or the second iteration 904, in this example the goal is to decode the assets in between the assets that have already been decoded, or in between the four assets that have already been decoded. Thus, the second iteration 904 increases the granularity at which the assets can be displayed between the four already decoded during the first iteration 902. Thus, in the first iteration 902, there were two assets separated by 90 degrees. After the second iteration 904, there are 4 assets separated by 45 degrees. Thus, after the second iteration, the error is reduced. The error continues to reduce after subsequent iterations, including the mod2 iteration 906. During the process, the separation between the assets keeps decreasing until the assets have all been decoded.

What have been described above are examples of the disclosure. It is not possible to describe every conceivable combination of components or method for purposes of describing the disclosure, but one should understand that many further combinations and permutations of the disclosure are possible. Accordingly, the disclosure is intended to embrace all such alterations, modifications, and variations that fall within the scope of this application, including the appended claims.

What is claimed is:

1. A method, comprising:
   displaying a static asset as background for displaying a set of dynamic assets that represent position indicators associated with position values on the static asset, wherein the set of dynamic assets includes:
   a first subset of dynamic assets that represents a first set of position values between a minimum position value and a maximum position value that have a first granularity; and
   a second subset of dynamic assets that represents a second set of position values between the minimum position value and the maximum position value that have a second granularity that is greater than the first granularity;
   sequentially retrieving, from a memory, the first subset of dynamic assets and the second subset of dynamic assets based on the second granularity being greater than the first granularity; and
   performing a full sweep, prior to retrieving the second subset of dynamic assets, by sequentially displaying assets of the set of dynamic assets having respective position values from the minimum position value to the maximum position value such that, based on the retrieving of the second subset of dynamic assets being incomplete, for a position value in the second subset of dynamic assets and not in the first subset of dynamic assets, display of an asset corresponding to the position value is omitted.

2. The method of claim 1, further comprising:
   mapping the assets of the set of dynamic assets to respective a position values on the static asset using a mapping operation while one subset of the set of dynamic assets is being retrieved; and
   updating a parameter of the mapping operation after one subset has been retrieved such that the mapping operation will map the assets at a finer level of granularity during the sequentially retrieving of a next subset of the set of dynamic assets.

3. The method of claim 2, wherein the mapping operation is a modulo operation.

4. The method of claim 1, wherein the performing of the full sweep starts after the first subset of dynamic assets has been retrieved, and continues concurrently with the sequentially retrieving of the second subset of dynamic assets.

5. The method of claim 1, further comprising displaying a dynamic asset at a correct position on the static asset corresponding to a value detected by a sensor after each of the first and second subsets of dynamic assets has been retrieved.

6. The method of claim 1, further comprising displaying a dynamic asset on the static asset at an approximate position that approximates a correct position after the full sweep is completed, and prior to when each of the first and second subsets of dynamic assets has been retrieved.

7. The method of claim 1, further comprising compressing the static asset and the first and second subsets of dynamic assets offline into a respective asset images and storing into the memory, and decoding the asset image associated with the static asset prior to displaying the static asset, and decoding the asset images associated with the first and second subsets of dynamic assets during the sequentially retrieving of each of the first and second subsets of dynamic assets.

8. The method of claim 1, wherein the static asset is a dial or telltale indicator, and the set of dynamic assets include indicator needles used for displaying parameters in a car dashboard instrument cluster.

9. The method of claim 1, wherein the retrieval of each of the first and second subsets of dynamic assets corresponds to an iteration of computer executable software.

10. An apparatus, comprising:
a memory configured to store a static asset and a set of dynamic assets that includes:
   a first subset of dynamic assets representing a first set of position values between a maximum position value and a minimum value that have a first granularity; and
   a second subset of dynamic assets representing a second set of position values between the maximum position value and the minimum value that have a second granularity that is greater than the first granularity and
a processor configured to execute computer executable components, the computer executable components comprising:
   a display component configured to display the static asset as background for displaying the set of dynamic assets;
   a retrieval component configured to sequentially retrieve the first subset of dynamic assets followed by the second subset of dynamic assets based on the second granularity being greater than the first granularity and
   a sweep component configured to perform a full sweep, prior to retrieving of all of the set of dynamic assets, by sequentially displaying assets of the set of dynamic assets from the minimum position value to the maximum position value, and back from the maximum position value to the minimum position value of the static asset such that, when a first position value is in the second set of position values and not in the first set of position values and the retrieving of the second subset of dynamic assets is incomplete, a dynamic asset in the second subset of dynamic assets that corresponds to the first position value is not displayed.

11. The apparatus of claim 10, wherein the computer executable components further comprise:
a mapping component configured to map the set of dynamic assets to respective position values on the static asset using a mapping operation while one subset of the first and second subsets of dynamic assets is being retrieved; and
an updating component configured to update a parameter of the mapping operation after one subset has been retrieved such that the mapping operation will map the dynamic assets at a finer level of granularity during the sequentially retrieving of a next subset of the first and second subsets of dynamic assets.

12. The apparatus of claim 11, wherein the mapping operation is a modulo operation.

13. The apparatus of claim 10, wherein performing the full sweep starts after the first subset of dynamic assets has been retrieved, and continues concurrently with the retrieving of the second subset of dynamic assets.

14. The apparatus of claim 10, wherein a dynamic asset is displayed at a correct position on the static asset corresponding to a value detected by a sensor after each of the first and second subsets of dynamic assets has been retrieved.

15. The apparatus of claim 10, wherein an approximate position that approximates a correct position is displayed after the full sweep is completed, and prior to when each of the first and second subsets of dynamic assets has been retrieved.

16. The apparatus of claim 10, wherein the static asset and the first and second subsets of dynamic assets are compressed offline into respective asset images and stored into the memory, and wherein the asset image associated with the static asset is decoded prior to being displayed, and the asset images associated with the first and second of subsets of dynamic assets are decoded during the sequentially retrieving of each of the first and second subsets of dynamic assets.

17. The apparatus of claim 10, wherein the static asset is a dial or telltale indicator, and the set of dynamic assets include indicator needles used for displaying parameters in a car dashboard instrument cluster.

18. The apparatus of claim 10, wherein a retrieval of one of the first and second subsets of dynamic assets corresponds to an iteration of computer executable software.

19. A device comprising:
a processing resource;
a non-transitory computer readable medium coupled to the processing resource and configured to store instructions that, when executed, cause the processing resource to:
   retrieve, from a memory, a set of dynamic assets corresponding to a set of values between a minimum value and a maximum value, wherein the set of dynamic assets includes:
      a first subset of dynamic assets that correspond to a first subset of values evenly spaced between the minimum value and the maximum value and having a first granularity; and
      a second subset of dynamic assets that correspond to a second subset of values evenly spaced between the minimum value and the maximum value and having a second granularity that is greater than the first granularity, wherein the retrieval retrieves the first subset of dynamic assets prior to retrieving the second subset of dynamic assets; and
   prior to completion of the retrieval of the set of dynamic assets, providing the set of dynamic assets for display in a sweep from the minimum value to the maximum value such that, based on the retrieval of the second subset of dynamic assets being incomplete, for a first value in the second subset of values and not in the first subset of values, omitting display of a dynamic asset of the second subset of dynamic assets that is associated with the first value.

20. The device of claim 19, wherein the non-transitory computer readable medium is configured to store further instructions that, when executed, cause the processing resource to:
   for the first value in the second subset of values and not in the first subset of values, based on the retrieval of the retrieval of the second subset of dynamic assets being incomplete, select a dynamic asset of the first subset of dynamic assets for display; and provide the dynamic asset of the first subset of dynamic assets for display.

\* \* \* \* \*